United States Patent [19]

Whiting

[11] Patent Number: 4,713,930
[45] Date of Patent: Dec. 22, 1987

[54] MOBILE BRUSH CUTTER

[76] Inventor: Peter E. Whiting, 281 Brook Street, Framingham, Mass. 01701

[21] Appl. No.: 862,873

[22] Filed: May 13, 1986

[51] Int. Cl.[4] ............................................. A01D 55/00
[52] U.S. Cl. ........................................ 56/10.8; 56/233
[58] Field of Search ....................... 56/10.7, 10.8, 124, 56/233–238, DIG. 11, DIG. 12

[56] References Cited

U.S. PATENT DOCUMENTS

| | | | |
|---|---|---|---|
| 3,157,016 | 11/1964 | Leydig et al. | 56/235 |
| 3,597,908 | 8/1971 | Schaefer | 56/233 |
| 3,913,304 | 10/1975 | Jodoin | 56/235 |
| 4,074,510 | 2/1978 | Teagle | 56/233 |
| 4,502,269 | 3/1985 | Cartner | 56/10.7 |

FOREIGN PATENT DOCUMENTS 961137  6/1960  United Kingdom ................. 56/237

*Primary Examiner*—Stephen J. Novosad
*Assistant Examiner*—William P. Neuder

*Attorney, Agent, or Firm*—John E. Toupal; Harold G. Jarcho

[57] ABSTRACT

A mobile brush cutter including a vehicle; a boom having one end pivotally supported by the vehicle; a hydraulic power system mounted on the vehicle and having controls operable by an operator thereof; a cutter supported by an opposite end of the boom and operatively coupled to the hydraulic power system, the cutter comprising an elongated bed knife having one end connected to the opposite end of the boom and having bed teeth that define longitudinally spaced apart slots for receiving stalks and a moving knife juxtaposed to the bed knife and mounted for longitudinal reciprocating movement relative thereto, the moving knife having moving teeth that define a plurality of cutting edges each shaped and arranged to reciprocate through a cutting zone transversely adjacent to a different one of the slots; and a retainer assembly fixed to said bed knife and shaped and arranged for sliding engagement with outer end portions of the moving teeth so as to prevent transverse separation thereof from the bed knife.

20 Claims, 13 Drawing Figures

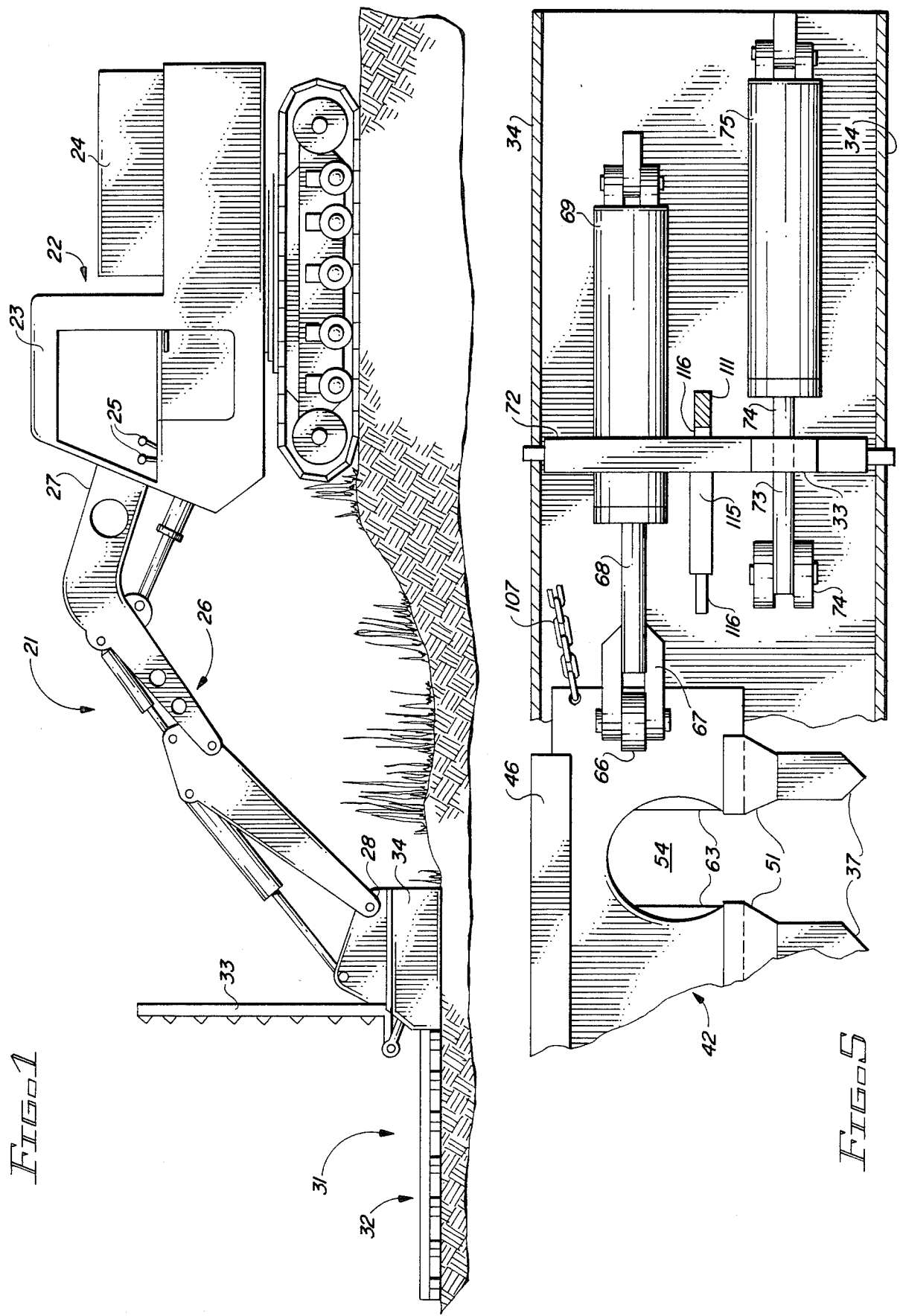

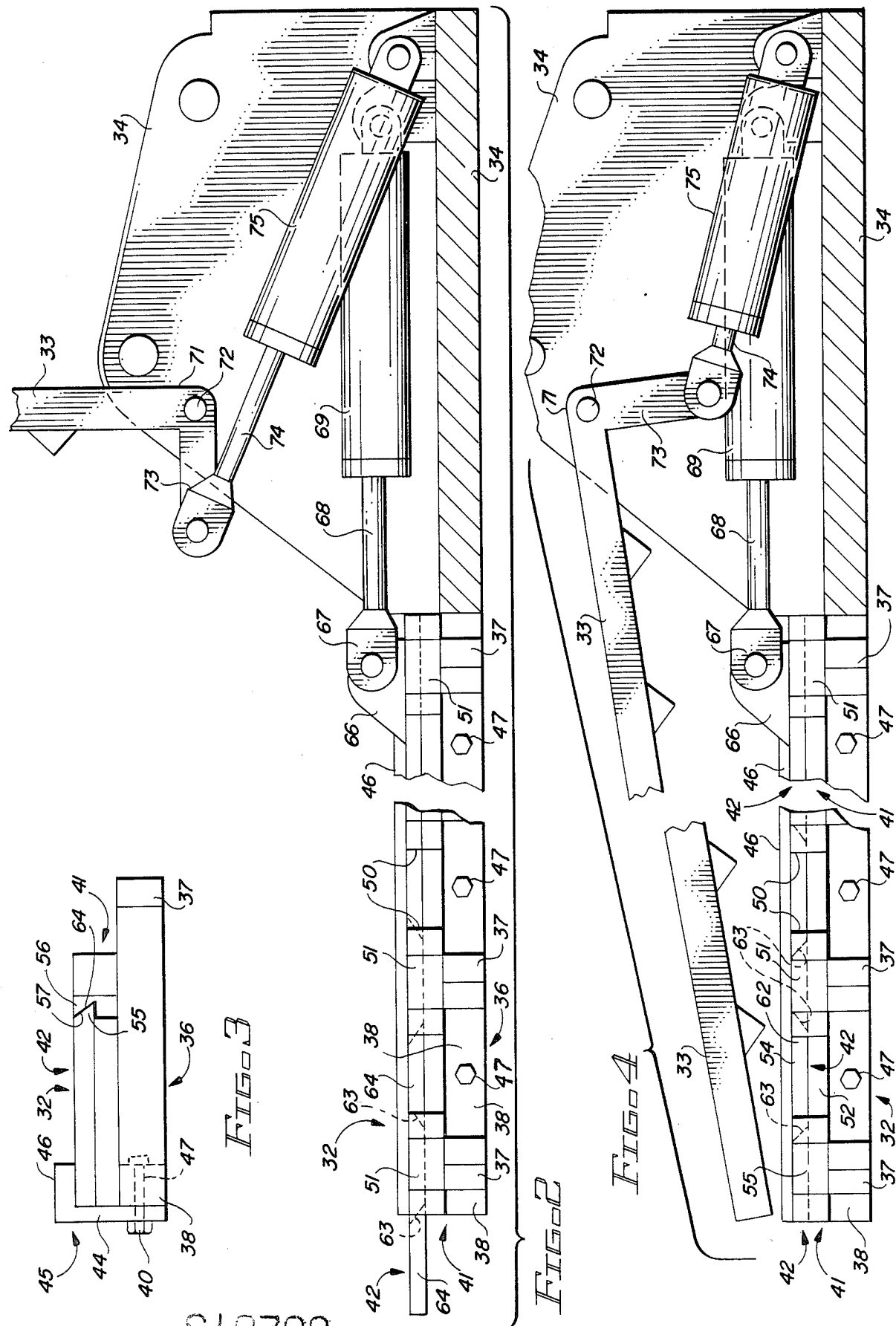

MOBILE BRUSH CUTTER

BACKGROUND OF THE INVENTION

The invention relates generally to a mobile brush cutter and, more particularly, to a hydraulically operated mobile brush cutter suitable for cutting relatively large diameter brush.

Small tractors equipped with moving sickles driven by power takeoffs and having limited hand lever adjustments typically are used for cutting weeds and grass along roadways. The mechanical power transmissions employed with such equipment require extensive operating and maintenance attention. In addition, because of limited cutting flexibility, the use of such machines in difficult terrain generally requires considerable follow-up hand work. Also known are brush cutter assemblies mounted on trucks so as to enhance mobility. A disadvantage of these truck mounted brush cutters is a requirement for two operators, one for the vehicle and one for the cutter.

A partial solution to the above problems was provided in U.S. Pat. Nos. 2,588,002; 2,588,003 and 2,588,004. Disclosed in those patents are self-propelled vehicles equipped with hydraulically activated cutter mechanisms and designed to permit simultaneous operation of the vehicle and the cutter by a single operator. Deficiencies of the patented brush cutters are a lack of job versatility and an inability to cut heavy brush of relatively large diameter.

The object of this invention, therefore, is to provide an improved, more versatile mobile brush cutter capable of cutting relatively heavy brush.

SUMMARY OF THE INVENTION

The invention is a mobile brush cutter including a vehicle; a boom having one end pivotally supported by the vehicle; a hydraulic power system mounted on the vehicle and having controls operable by an operator thereof; a cutter supported by an opposite end of the boom and operatively coupled to the hydraulic power system, the cutter comprising an elongated bed knife having one end connected to the opposite end of the boom and having bed teeth that define longitudinally spaced apart slots for receiving stalks and a moving knife juxtaposed to the bed knife and mounted for longitudinal reciprocating movement relative thereto, the moving knife having moving teeth that define a plurality of cutting edges each shaped and arranged to reciprocate through a cutting zone transversely adjacent to a different one of the slots; and a retainer assembly fixed to said bed knife and shaped and arranged for sliding engagement with outer end portions of the moving teeth so as to prevent transverse separation thereof from the bed knife. The retainer assembly prevents separation of the moving and bed knives and thereby facilitates the cutting of relatively large diameter brush.

According to specific features of the invention, the retainer assembly comprises a reentrant lip on each of the knife teeth, the lips forming retainer slots that receive and accommodate reciprocating movement of the outer end portions of the moving teeth, and the outer end portions have a width greater than the spacing between the retainer slots. This arrangement insures against separation of the moving and bed knives.

According to other features of the invention, the cutting edges comprise longitudinally directed opposing beveled edges on each of the moving teeth, the slots are defined by substantially parallel edges on the bed teeth, the spacing between the beveled edges on directly adjacent moving teeth is substantially equal to the width of the slots, and the reentrant lips on each of the bed teeth comprise portions that extend longitudinally beyond the parallel edges thereof. This structural arrangement optimizes the operational capability of the cutter mechanism.

According to still another feature, the invention includes a hydraulic cylinder and piston assembly operatively coupled to the hydraulic power system, the assembly comprising a piston adapted for reciprocating movement in response to activation of the controls and having one end connected to one end of the moving knife so as to induce reciprocating movement thereof in response to activation of the controls. Directly driving the moving knife with a hydraulically powered reciprocating piston enhances the large material cutting capability of the device.

In a preferred form the invention includes an elongated jaw operatively coupled to the hydraulic power system and having one end pivotally mounted on the opposite end of the boom, the jaw being pivotable by operation of the controls into a closed position adjacent to and substantially coextensive with the cutter and an open position extending transverse thereto. The jaw can be used to handle brush previously cut by the cutter mechanism.

According to another feature, the cutter includes an articulated joint coupling cutter to the opposite end of the boom, the articulated joint permitting plural senses of relative movement between the cutter and the opposite end of the boom. The provision of an articulated joint provides cutting versitility for the cutter mechanism.

DESCRIPTION OF THE DRAWINGS

These and other objects and features of the invention will become more apparent upon a perusal of the following description taken in conjunction with the accompanying drawings wherein:

FIG. 1 is a schematic elevational view of a mobile brush cutter according to the invention;

FIG. 2 is a partially cut-away schematic side view of a cutter assembly shown in FIG. 1;

FIG. 3 is a schematic end view of the cutter assembly shown in FIG. 2;

FIG. 4 is a partially cut-away schematic side view of the cutter assembly in a different operating position than that is shown in FIG. 2;

FIG. 5 is a schematic partial top view illustrating a portion of the cutter assembly shown in FIGS. 2–4;

DESCRIPTION OF THE PREFERRED EMBODIMENT

Figure 6:
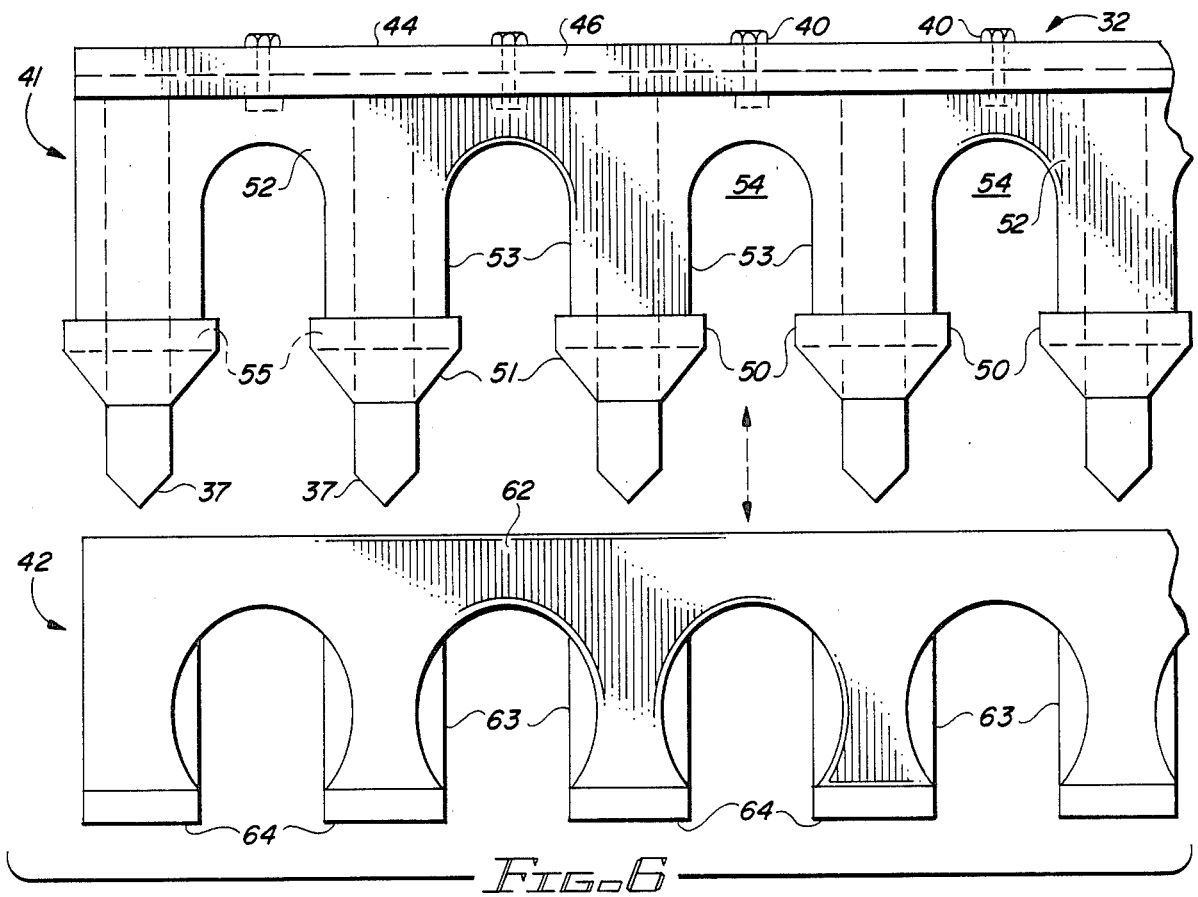
FIG. 6 is a schematic exploded top view illustrating another portion of the cutter assembly shown in FIGS. 2–5.

Referring now to FIG. 1 there is shown a mobile brush cutter 21 according to the present invention. A mobile excavator vehicle 22 has an operator's cab 23 and a hydraulic power system 24. Mounted within the cab 23 are operating controls 25 operatively coupled to the hydraulic power system 24. An articulated boom 26 has one end 27 pivotally connected to the vehicle 22 and an opposite end connected by an articulated wrist connection 28 to a cutter assembly 31. Included in the cutter assembly 31 are a reciprocating cutter 32, a pivotable jaw 33 and a hydraulic component housing 34.

As illustrated in FIGS. 2-6, the reciprocating cutter 32 includes an elongated base shoe 36 formed by a plurality of transverse lines 37 extending transversely from a longitudinally oriented base 38. Supported on the shoe 36 and longitudinally coextensive therewith is a bed knife 41. A moving knife 42 is supported by and longitudinally coextensive with the bed knife 41. Engaging rear edges of the longitudinal base 38, the bed knife 41 and the moving knife 42 is one leg 44 of an L-shaped hold-down bracket 45, the other leg 46 of which covers a rear, upper surface portion of the moving knife 42. A plurality of bolts 46 extend through the base 38 of the shoe 36 and the leg 44 of the hold-down bracket 45 and are retained by nuts 47.

The bed knife 41 includes a plurality of bed-teeth 51 that extend transversely from a trunk portion 52. Each of the bed-teeth 51 has parallel edges 53 and those on directly adjacent teeth 51 define a plurality of longitudinally spaced apart recess slots 54 in a face of the bed knife 41. Formed by a reentrant lip 56 having an internally beveled surface 57 at the outer end of each of the bed-teeth 51 is a retainer slot 55. As shown in FIG. 6, each of the bed-teeth 51 have transverse projections 50 that extend the retainer slots 55 longitudinally beyond the parallel edges 53 that define the recess slots 54.

The moving knife 42 is formed by a plurality of longitudinally spaced apart moving teeth 61 that extend transversely from a yoke 62. The edges of each of the moving teeth 61 are beveled to form oppositely directed longitudinally directed cutting edges 63. The spacing between the cutting edges 63 on directly adjacent teeth 61 are spaced apart by a distance substantially equal to the width of the slots 54 in the bedknife 41. The tips of the moving teeth 61 are beveled to form surfaces 64 that are mated to the beveled surfaces 57 of the reentrant lips 56 on the bed knife 41. Thus, as shown in FIG. 3, transverse movement of the moving knife 42 is prevented by sliding engagement of its beveled surfaces 64 with the beveled surfaces 57 on the bedknife 41 and between surface portions of its yoke 62 with the legs 44 and 46 of the hold-down bracket 45.

As shown in FIG. 2, a tab 66 on an inner end of the moving knife 42 is pivotally connected to an outer end 67 of a piston 68 accommodated by a hydraulic cylinder 69 mounted in the housing 34. Thus, hydraulically induced reciprocating movement of the piston rod 68 produces reciprocating movement of the moving knife 42 relative to the bedknife 41. During such reciprocating movement, the beveled cutting edges 63 on the moving teeth 61 reciprocate through cutting zones transversely adjacent to each of the slots 54 in the bed knife 41. Consequently, stalks of brush that have entered the slots 54 are sheared by the cutting edges 63. During these cutting operations, the transverse retention of the moving knife 52 is insured by sliding engagement between the yoke 62 and the hold-down bracket 45 and between the beveled edges 64 on the moving teeth 61 and the beveled surfaces 57 on the reentrant lips 56 of the bed knife 41. Continuous engagement between certain portions of those latter surfaces is insured by providing widths for the beveled tips 64 of the moving teeth 61 that is greater than the spacing between adjacent retainer slots 55 on the bed knife 41.

As shown in FIG. 4, an inner end 71 of the clamping jaw 33 is supported on the housing 34 by a pivot pit 72. A transverse arm 73 has one end attached to the inner end 71 of the clamping jaw 33 and an opposite end pivotally connected to a piston rod 74 that is accommodated by a hydraulic cylinder 75 in the housing 34. In response to outward movement of the piston rod 74 the clamping jaw 33 is moved into an open position substantially transverse to the cutter assembly 32 as shown in FIG. 2. However, in response to inward movement of the piston rod 74 the clamping jaw 33 is moved into a closed position adjacent to and substantially longitudinally coextensive with the cutter assembly 32 as shown in FIG. 4.

Figure 7:
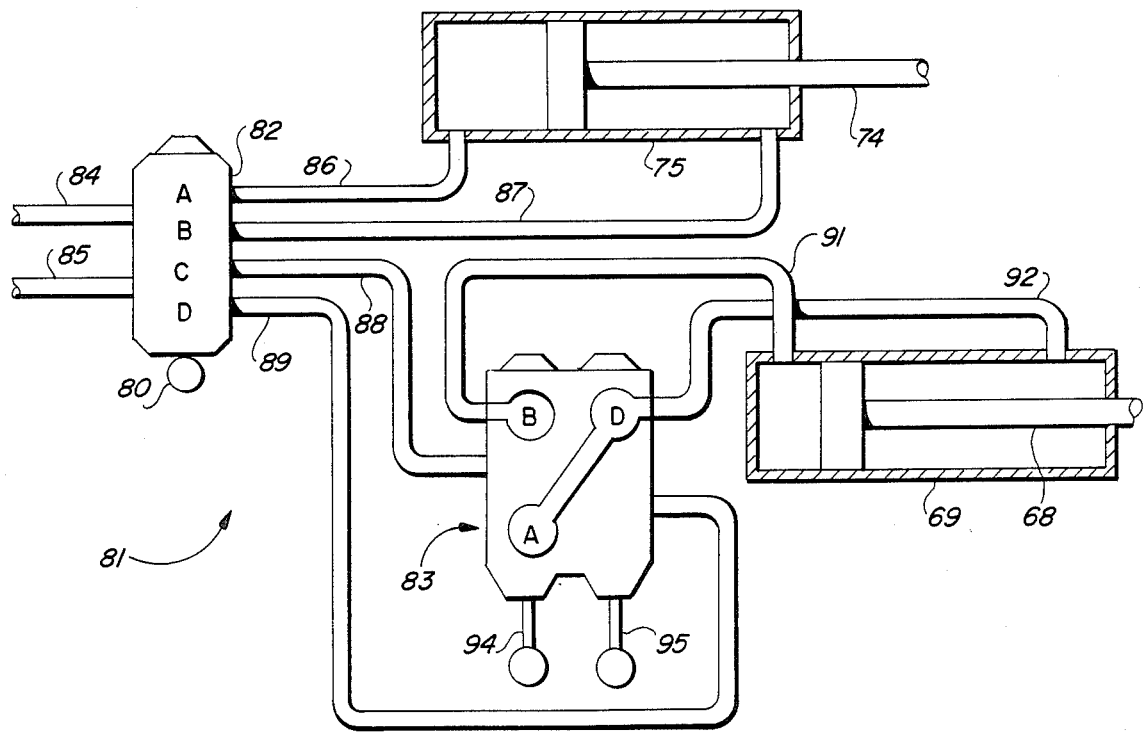
FIG. 7 is a schematic diagram of a hydraulic control system for the cutter assembly shown in FIGS. 2–6.

Schematically illustrated in FIG. 7 is a hydraulic control system 81 that is retained in the housing 34 and can be activated to control movement of the reciprocating cutter 32 and the clamping jaw 33. The control system 81 includes a diverter valve 82 with an operating lever 80 that can be selectively manipulated to provide hydraulic fluid flow to either the clamping jaw cylinder 75 or a cutter controlling cycling valve 83. Input feed and return lines 84, 85 respectively, of the diverter valve 82 are coupled to the hydraulic power system 24 on the excavator vehicle 22. One set of output lines 86, 87 from the diverter valve 82 are connected to the clamping jaw cylinder 75 while another set of output lines 88, 89 are connected to the cycling valve 83. Other lines 91, 92 to the cycling valve 83 are connected, respectively, to opposite ends of the hydraulic cylinder 69 that controls operation of the reciprocating cutter 32.

Figure 8:
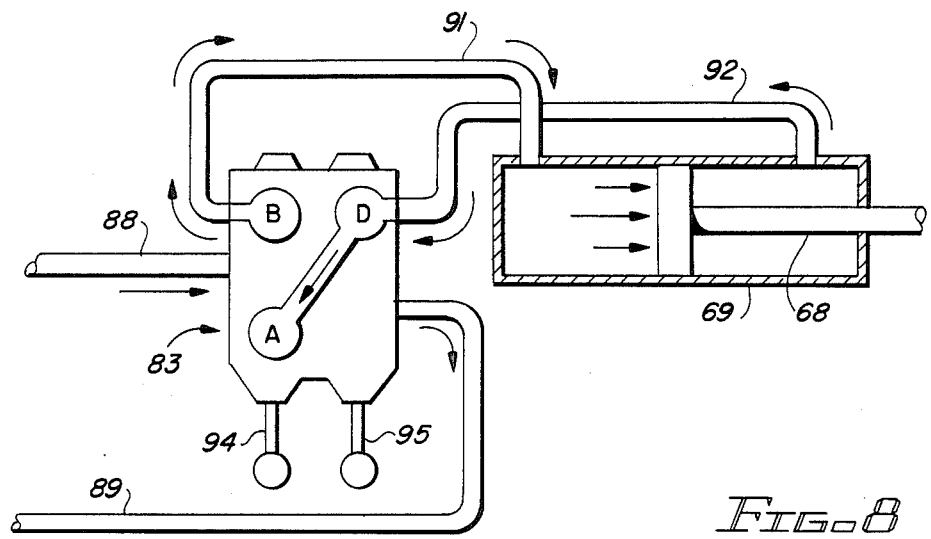
FIG. 8 is a schematic diagram of illustrating one mode of operation for the hydraulic control system shown in FIG. 7.
Figure 9:
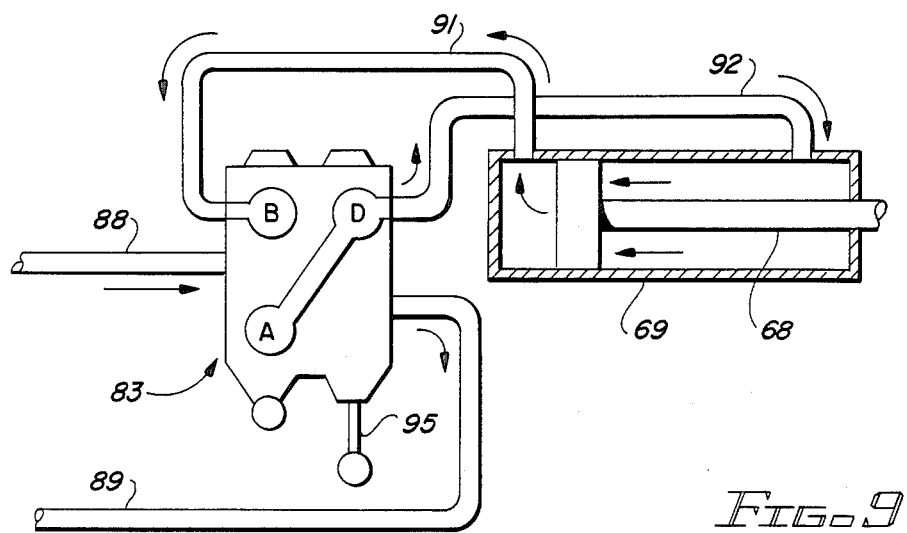
FIG. 9 is a schematic diagram illustrating another operational mode of the hydraulic system shown in FIG. 7.

With the operating lever 80 of the diverter valve 82 in the position shown in FIG. 7, hydraulic fluid flow is provided for the cycling valve 83 via the feed line 88 and return line 89 as indicated in FIG. 8. Initially operating levers 94, 95 of the valve 83 are positioned so as to provide hydraulic fluid flow through the line 91 to an inner end of the cylinder 69. Thus, hydraulic fluid entering the cylinder 69 forces the piston rod 68 outwardly to produce an outward stroke of the moving knife 42. Return fluid from the cylinder 69 passes through the line 92, the valve 83 and the return line 89. Upon reaching the end of a piston stroke, pressure increases to a preset detent kickout pressure causing the first spool 94 of the valve 83 to return to neutral position as shown in FIG. 9. Hydraulic fluid flow then is directed by the valve 83 through the line 92 into an outer end of the cylinder 69 while return therefrom flows through the line 91. Resultant retraction of the piston rod 68 produces an inward stroke of the moving knife 42. When the piston 68 is fully retracted, fluid pressure increases to a predetermined kickout level to return the second control lever 95 to a neutral position.

Figure 10:
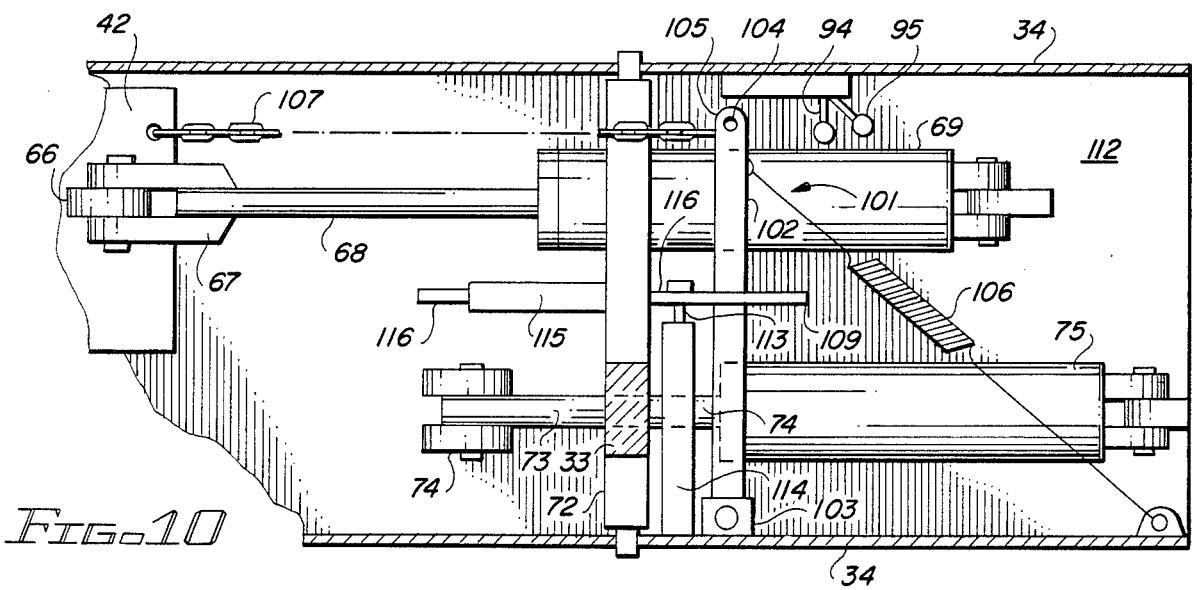
FIG. 10 is a schematic top view of the cutter assembly showing a mechanical reset mechanism for the hydraulic system of FIGS. 7–9.
Figure 11:
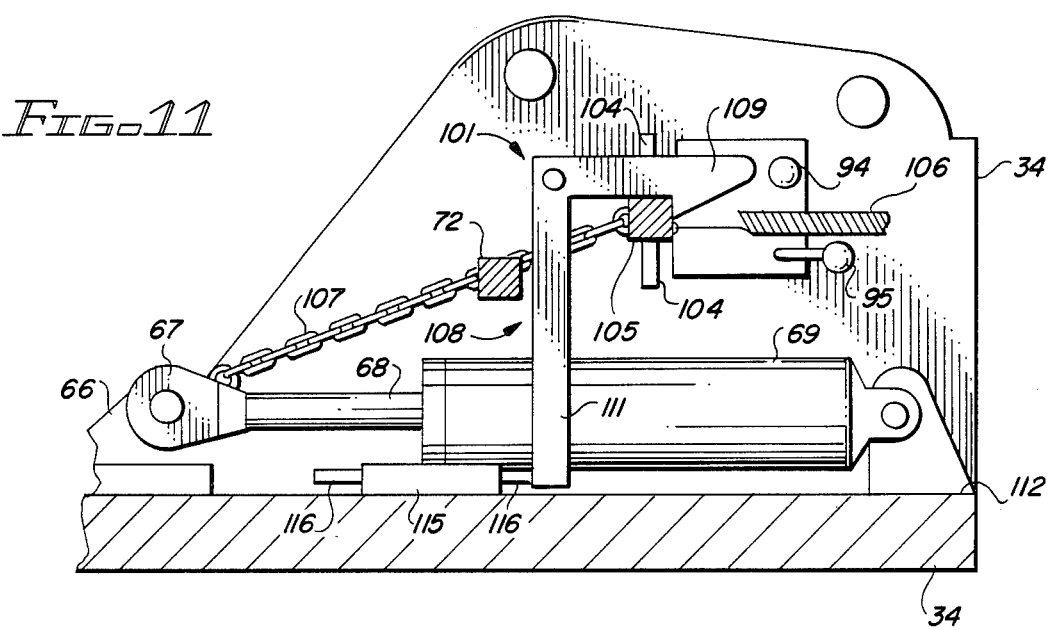
FIG. 11 is a schematic side view depicting the reset mechanism shown in FIG. 10.
Figure 12:
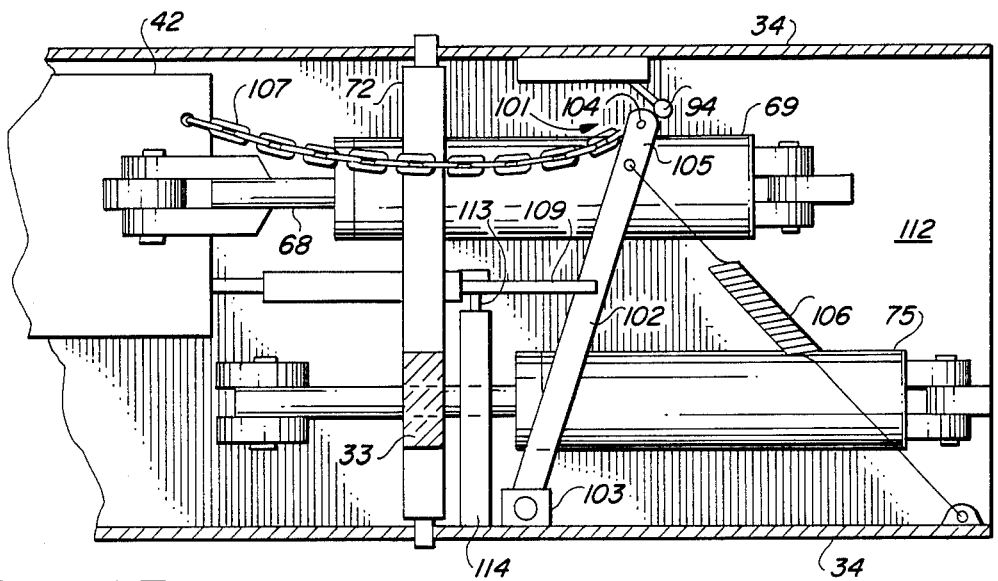
FIG. 12 is a schematic top view of the reset mechanism in a different operating position than that shown in FIG. 10.

Continuous reciprocating motion of the moving knife 42 is provided by a valve reset mechanism 101 illustrated in FIGS. 10-12. A tube 102 has one end pivotally connected to a bracket 103 fixed to the housing 34. Retained by an opposite end 105 of the tube 102 is a reset pin 104. A tension spring 106 is connected between the housing 34 and the opposite end 105 of the tube 102. Also fixed to the opposite end 105 is one end of a chain 107, the other end of which is fixed to the moving knife 42. An L-shaped latching member 108 has an upper leg formed as a hook 109 that is biased normally in a position engaging the tube 102 to prevent movement thereof by the spring 106. A lower leg 111 of the latching member 108 extends to a position adjacent to a base surface 112 of the housing 34. Pivotally supporting the mid-portion of the latching member 108 is a pivot pin 113 extending from a block 114 fixed to the housing 34. A bushing 115 mounted on the base surface 112 retains a slidable pin 116 that is aligned between an inner end of the moving knife 42 and the lower leg 111 of the latching member 108.

During an inward stroke, the moving knife forces the slidable pin 116 into engagement with the lower leg 11 causing counter clockwise rotation of the latching member 108 as seen in FIG. 11. As a result thereof, the hook portion 109 is moved out of engagement with the tube 102. After release, the tube 102 is pivoted about bracket 103 producing engagement between the reset pin 104 and the valve levers 94, 95 as shown in FIG. 12. This action returns the valve 83 to its original operating condition and results in a new operational cycle as described above. During the outward stroke of the moving knife 42, the chain 107 returns the tube 102 into latching engagement with the hook portion 109.

Figure 13:
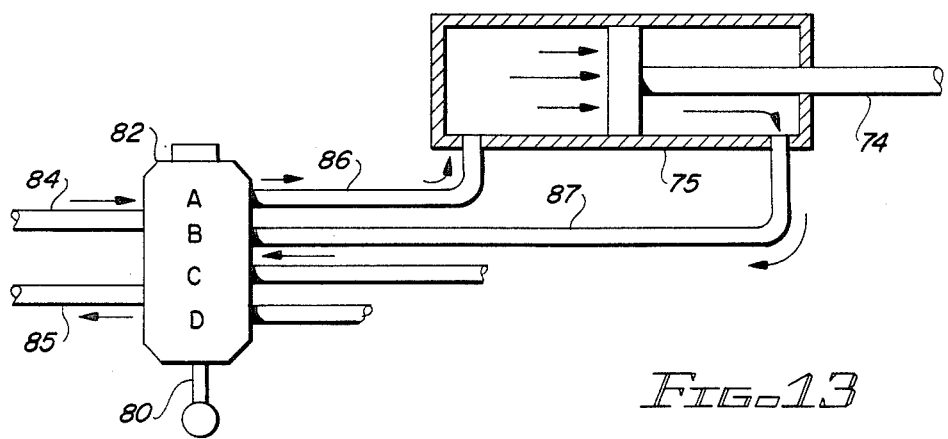
FIG. 13 is a schematic diagram illustrating another operational mode of the hydraulic system shown in FIG. 7.

With the operating lever 80 of the diverter valve 82 in the position shown in FIG. 13, hydraulic fluid flow is provided to the clamping jaw cylinder 75. By appropriate operation of the controls 25 in the cab 23 of the vehicle 22, fluid flow is produced through line 84, the valve 82 and the line 86 to an inner end of the cylinder 75 producing an outward stroke of the piston 74 while fluid is returned via line 87, the valve 82 and the line 85. In response thereto, the clamping jaw 33 is moved into the open position shown in FIG. 2. Conversely, fluid flow through line 85, the valve 82 and the line 87 to the outer end of the cylinder 75 produces an inward stroke of the piston 74 while fluid is returned via line 86, the valve 82 and the line 84. The inward stroke of the piston 74 moves the jaw 33 into the closed position shown in FIG. 4 and clamps any intermediate, previously cut brush against the cutter 32.

OPERATION

During use of the invention 21, an operator within the cab 23 manipulates the controls 25 in a manner to move the articulated boom 26 and thereby strategically position the cutter assembly 31. Obtaining a desired orientation of the assembly 31 is facilitated by the wrist connection 28. By appropriate control of the wrist 28, the cutter assembly 31 can be selectively positioned to either cut vertically growing brush or to trim horizontally extending branches. In either case, the cutter assembly 31 is oriented transversely to the growing direction of the brush to be cut. Subsequent forward movement of the assembly 31 causes stalks of brush to enter the slots 54 in the bedknife 41 and those stalks are sheared by the reciprocating cutting edges 63 on the moving knife 42. Continuous reciprocation of the moving knife 42 is provided by the hydraulic control system in the manner described above.

After completion of cutting operations, the severed brush can be moved and stacked by appropriate operation of the clamping jaw 33 and the articulated boom 26. The hydraulic diverter valve 82 is first actuated to simultaneously deactivate the cycling valve 83 and thereby terminate reciprocating movement of the moving knife 42 and to activate the flow of hydraulic fluid to the clamping jaw cylinder 75. With the clamping jaw 33 in the transverse position shown in FIG. 2, the cutter 32 is moved under a stack of cut brush and the hydraulic controls 25 are actuated as described above to move the clamping jaw 33 into its closed position shown in FIG. 4 and thereby clamp the cut brush against the cutter 31. The vehicle 22 and the boom 26 then are operated to move the cutter assembly 31 into a position preselected for deposit of the cut brush. Further manipulation of the hydraulic controls 25 produces movement of the clamping jaw 33 into its open position (FIG. 4) and releases the collected brush.

Obviously, many modifications and variations of the present invention are possible in light of the above teachings. It is to be understood, therefore, that the invention can be practiced otherwise than as specifically described.

What is claimed is:

1. A mobile brush cutter comprising:
   a vehicle;
   a boom having one end pivotally supported by said vehicle;
   hydraulic power system means mounted on said vehicle and having controls operable by an operator thereof;
   a cutter supported by an opposite end of said boom and operatively coupled to said hydraulic power system; said cutter comprising an elongated bed knife having a face and one end connected to said opposite end of said boom and having bed teeth that define longitudinally spaced apart slots in said face for receiving stalks and a moving knife juxtaposed face to face to said bed knife and mounted for longitudinal reciprocating movement relative to said bed knife, said moving knife having moving teeth that define a plurality of cutting edges each shaped and arranged to reciprocate through a cutting zone transversely adjacent to a different one of said slots; and
   retainer means fixed to said bed knife and shaped and arranged for sliding engagement with outer end portions of said moving teeth so as to prevent transverse separation thereof from said bed knife.

2. A brush cutter according to claim 1 wherein said retainer means comprises a reentrant lip on each of said knife teeth, said lips forming retainer slots that receive and accommodate reciprocating movement of said outer end portions of said moving teeth.

3. A brush cutter according to claim 2 wherein said outer end portions have a width greater than the spacing between said retainer slots.

4. A brush cutter according to claim 3 wherein said cutting edges comprise longitudinally directed opposing beveled edges on each of said moving teeth.

5. A brush cutter according to claim 4 wherein said slots are defined by substantially parallel edges on said bed teeth, and the spacing between said beveled edges on directly adjacent moving teeth is substantially equal to the width of said slots.

6. A brush cutter according to claim 5 wherein said reentrant lips on each of said bed teeth comprise portions that extend longitudinally beyond said parallel edges thereof.

7. A brush cutter according to claim 2 wherein said outer end portions of said moving teeth define beveled teeth surfaces, said retainer slots define beveled lip surfaces, and said beveled teeth surfaces slidably engage said beveled lip surfaces during said reciprocating movement of said moving knife.

8. A brush cutter according to claim 7 wherein said outer end portions have a width greater than the spacing between said retainer slots.

9. A brush cutter according to claim 8 wherein said cutting edges comprise longitudinally directed opposing beveled edges on each of said moving teeth.

10. A brush cutter according to claim 9 wherein said slots are defined by substantially parallel edges on said bed teeth, and the spacing between said beveled edges on directly adjacent moving teeth is substantially equal to the width of said slots.

11. A brush cutter according to claim 10 wherein said reentrant lips on each of said bed teeth comprise portions that extend longitudinally beyond said parallel edges thereof.

12. A brush cutter according to claim 1 including a hydraulic cylinder and piston assembly operatively coupled to said hydraulic power system, said assembly comprising a piston adapted for reciprocating movement in response to activation of said controls and having one end connected to one end of said moving knife so as to induce reciprocating movement thereof in response to said activation of said controls.

13. A brush cutter according to claim 12 wherein said retainer means comprises a reentrant lip on each of said knife teeth, said lips forming retainer slots that receive and accommodate reciprocating movement of said outer end portions of said moving teeth.

14. A brush cutter according to claim 13 wherein said outer end portions have a width greater than the spacing between said retainer slots.

15. A brush cutter according to claim 14 wherein said cutting edges comprise longitudinally directed opposing beveled edges on each of said moving teeth.

16. A brush cutter according to claim 15 wherein said slots are defined by substantially parallel edges on said bed teeth, and the spacing between said beveled edges on directly adjacent moving teeth is substantially equal to the width of said slots.

17. A brush cutter according to claim 16 wherein said reentrant lips on each of said bed teeth comprise portions that extend longitudinally beyond said parallel edges thereof.

18. A brush cutter according to claim 13 wherein said outer end portions of said moving teeth define beveled teeth surfaces, said retainer slots define beveled lip surfaces, and said beveled teeth surfaces slidably engage said beveled lip surfaces during said reciprocating movement of said moving knife.

19. A brush cutter according to claim 1 including an elongated jaw having operatively coupled to said hydraulic power system and having one end pivotally mounted on said opposite end of said boom, said jaw being pivotable by operation of said controls into a closed position engaging and substantially coextensive with said cutter and an open position extending transverse thereto.

20. A brush cutter according to claim 1 including an articulated joint coupling said cutter to said opposite end of said boom, said articulated joint permitting plural senses of relative movement between said cutter and said opposite end of said boom.

* * * * *